(12) United States Patent
Tanaka et al.

(10) Patent No.: US 12,502,877 B2
(45) Date of Patent: Dec. 23, 2025

(54) LAMINATE AND PACKAGING BAG (71) Applicant: TOPPAN INC., Tokyo (JP)

(72) Inventors: Ryota Tanaka, Tokyo (JP); Ayumi Tanaka, Tokyo (JP); Takeshi Nishikawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 251 days.

(21) Appl. No.: 17/585,870

(22) Filed: Jan. 27, 2022

(65) Prior Publication Data

US 2022/0153006 A1    May 19, 2022

Related U.S. Application Data (63) Continuation of application No. PCT/JP2020/028923, filed on Jul. 28, 2020.

(30) Foreign Application Priority Data

Jul. 29, 2019  (JP) ................................ 2019-138972

(51) Int. Cl.
  *B32B 27/32* (2006.01)
  *B32B 7/028* (2019.01)
  *B32B 27/08* (2006.01)

(52) U.S. Cl.
  CPC .............. *B32B 27/32* (2013.01); *B32B 7/028* (2019.01); *B32B 27/08* (2013.01); *B32B 2250/03* (2013.01); *B32B 2250/242* (2013.01); *B32B 2255/10* (2013.01); *B32B 2255/20* (2013.01); *B32B 2307/308* (2013.01); *B32B 2307/31* (2013.01); *B32B 2307/7242* (2013.01); *B32B 2307/736* (2013.01); *B32B 2439/46* (2013.01)

(58) Field of Classification Search
  CPC ......... B32B 27/32; B32B 7/028; B32B 27/08; B32B 2250/03; B32B 2250/242; B32B 2255/10; B32B 2255/20; B32B 2307/7242; B32B 2307/736; B32B 2439/46
  See application file for complete search history.

(56) References Cited

U.S. PATENT DOCUMENTS

| 2017/0157906 | A1* | 6/2017 | Nishikawa | ............ G02F 1/1336 |
| 2018/0009206 | A1 | 1/2018 | Murase et al. | |
| 2018/0036999 | A1* | 2/2018 | Tokinoya | ................ B32B 27/36 |
| 2019/0023468 | A1 | 1/2019 | Ishii et al. | |
| 2019/0283946 | A1* | 9/2019 | Kudo | ..................... B32B 27/302 |
| 2020/0047960 | A1* | 2/2020 | Kono | ...................... C23C 16/12 |
| 2021/0078314 | A1* | 3/2021 | Alvarez | ................ B32B 27/302 |
| 2023/0087185 | A1* | 3/2023 | Kitahara | ............... B32B 27/283 428/35.4 |

FOREIGN PATENT DOCUMENTS

| CN | 201980564 U | 9/2011 | |
| CN | 110023201 A | 7/2019 | |
| EP | 3 437 856 A1 | 6/2019 | |
| JP | H06179473 A | 6/1994 | |
| JP | H08-230123 A | 9/1996 | |
| JP | 09-290477 A | 11/1997 | |
| JP | 2825898 B2 | 11/1998 | |
| JP | 11156983 A * | 6/1999 | |
| JP | H11-156983 A | 6/1999 | |
| JP | 2000-218753 A | 8/2000 | |
| JP | 2006-062115 A | 3/2006 | |
| JP | 2006-116703 A | 5/2006 | |
| JP | 2006-116704 A | 5/2006 | |
| JP | 2008-132614 A | 6/2008 | |
| JP | 2010-253862 A | 11/2010 | |
| JP | 2013248743 A * | 12/2013 | |
| JP | 2014-055283 A | 3/2014 | |
| JP | 2017-074750 A | 4/2017 | |
| JP | 2017-178357 A | 10/2017 | |
| WO | WO-2004/048081 A | 6/2004 | |
| WO | WO-2015/012324 A1 | 1/2015 | |
| WO | WO-2016/158794 A1 | 10/2016 | |
| WO | WO-2017/170574 A1 | 5/2017 | |
| WO | WO-2018101464 A1 * | 6/2018 | ........... B32B 15/082 |
| WO | WO-2018181900 A1 * | 10/2018 | ............. B32B 15/08 |

(Continued)

OTHER PUBLICATIONS

Machine Translation of Fujita et al. (JP 11156983 A) (Year: 1999).*
Machine Translation of Yamada et al. (JP 2013248743 A) (Year: 2013).*
"Sustainability Sustainable flexible packaging", Wipf AG, Dec. 17, 2015 (https://issuu.com/wipfag/docs/wipf nachhaltigkeitsbroschuere e we/1).
Communication pursuant to Rule 114(2) EPC, Third Party Observations, issued in corresponding European Patent Application No. 20847009.6, dated Dec. 15, 2022.
G. Rebitzer, "Plastic Packaging, Sustainability & The Circular Economy: Can they ever co-exist?" Amcor Flexibles, Oct. 26, 2018 (https://www.theconsumergoodsforum.com/wp-content/uploads/2018/10/SRS-2018-Special-Session-Amcor.pdf).

(Continued)

*Primary Examiner* — Callie E Shosho
*Assistant Examiner* — Bethany M Miller
(74) *Attorney, Agent, or Firm* — Foley & Lardner LLP (57) ABSTRACT

A laminate including a first base material layer, a second base material layer, and a sealant layer in this order, wherein all three layers include a polyolefin film; the polyolefin film of the first base material layer or the second base material layer includes an inorganic oxide layer on at least one surface thereof; and each of the first base material layer, the second base material layer, and the sealant layer has a heat shrinkage rate, in a travel direction after heating at 120° C. for 15 minutes, which satisfies the following inequalities: heat shrinkage rate of the second base material layer≤5% (Inequality 1); heat shrinkage rate of the second base material layer≥heat shrinkage rate of the first base material layer (Inequality 2); and, heat shrinkage rate of the second base material layer≥heat shrinkage rate of the sealant layer (Inequality 3).

13 Claims, 1 Drawing Sheet

(56) References Cited

FOREIGN PATENT DOCUMENTS

WO     WO-2019018127 A1 * 1/2019 ............... B32B 1/02

OTHER PUBLICATIONS

L. Zerbini, et al., "Recyclability Revolution in High-Barrier Film" Packaging Europe, Nov. 19, 2018 (https :// ceflex.eu/wp-content/ uploads/2018/ 11/P E-13-5-Amcor. pdf) (https://ceflex.eu/recyclability-revolution-in-high-barrier-film/).

Office Action issued in corresponding Chinese Patent Application No. 202080051707.9, dated Feb. 22, 2023.

International Searching Authority, "International Search Report," issued in connection with International Patent Application No. PCT/JP2020/028923, dated Oct. 13, 2020, 5 pages.

International Searching Authority, "Written Opinion," issued in connection with International Patent Application No. JP2020/028923, dated Oct. 13, 2020, 3 pages.

Office Action dated Dec. 2, 2021 issued in a corresponding Japanese Patent Application No. 2019-138972, (17 pages).

Pyrene® Film-CT (CPP Film) http://www.toyobo.co.jp/seihin/film/ (2010).

Uchida, et al., "The Effect of $O_3$ Support for Fabrication of $AlO_x$ Thin Film by Mist CVD Technique," Journal of the Society of Materials Science, Japan, vol. 62, No. 11 pp. 663-667, Nov. 2013.

Extended European Search Report, dated Jul. 17, 2022, issued in corresponding European Patent Application No. 20847009.6.

\* cited by examiner

LAMINATE AND PACKAGING BAG

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/028923, filed on Jul. 28, 2020, which is based upon and claims the benefit of priority to Japanese Patent Application No. 2019-138972, filed on Jul. 29, 2019; the disclosures of which are incorporated herein by reference in their entirety.

TECHNICAL FIELD

The present invention relates to a laminate and a packaging bag.

BACKGROUND

A laminate having a biaxially stretched PET (polyethylene terephthalate) film having excellent heat resistance and toughness as a base film and a polyolefin film of polyethylene, polypropylene or the like as a sealant layer is known (for example, PTL 1).

CITATION LIST

Patent Literature

[PTL 1] JP 2017-178357 A

SUMMARY OF THE INVENTION

Technical Problem

In recent years, due to increasing awareness of environmental issues caused by marine plastic waste problems and the like, there has been a demand for higher efficiency in separate collection and recycling of plastic materials. That is, there has been a demand for formation of a laminate for packaging from a single material (i.e., a mono material), which has conventionally been improved in performance by combining various different materials.

In order to realize formation of a laminate from a single material, it is necessary to use the same material for its constituent films. However, when a laminate is prepared using a polyolefin-based film, the resulting packaging bag may not be able to withstand high-temperature retort treatment.

The present invention has been made in view of the above circumstances, and an object thereof is to provide a laminate capable of high-temperature retort treatment when formed into a packaging bag even when composed mainly of a polyolefin-based film. Another object of the present invention is to provide a packaging bag using the laminate.

Solution to Problem

One aspect of the present invention provides a laminate including a first base material layer, a second base material layer, and a sealant layer in this order,
wherein the first base material layer, the second base material layer, and the sealant layer all include a polyolefin film;
wherein the polyolefin film of the first base material layer or the second base material layer includes an inorganic oxide layer on at least one surface thereof; and
wherein each of the first base material layer, the second base material layer, and the sealant layer has a heat shrinkage rate, in a travel direction (MD direction) after heating at 120° C. for 15 minutes, which satisfies the following inequalities:

Heat shrinkage rate of the second base material layer≤5%  (Inequality 1)

Heat shrinkage rate of the second base material layer≥Heat shrinkage rate of the first base material layer  (Inequality 2)

Heat shrinkage rate of the second base material layer≥Heat shrinkage rate of the sealant layer  (Inequality 3)

(Wherein Heat shrinkage rate (%)=(Travel-direction length before heating−Travel-direction length after heating)/Travel-direction length before heating×100).

In one aspect, the heat shrinkage rates may satisfy the following inequalities.

Heat shrinkage rate of the second base material layer−Heat shrinkage rate of the first base material layer≥0.3%  (Inequality 4)

Heat shrinkage rate of the second base material layer−Heat shrinkage rate of the sealant layer≥0.5%  (Inequality 5)

In one aspect, the heat shrinkage rates may satisfy the following inequalities.

Heat shrinkage rate of the sealant layer≤2%  (Inequality 6)

In one aspect, the polyolefin film of the first base material layer or the second base material layer may include the inorganic oxide layer on at least one surface thereof and a gas barrier coating layer on the inorganic oxide layer, and the gas barrier coating layer may be formed using a composition for forming a gas barrier coating layer containing at least one selected from the group consisting of a hydroxyl group-containing polymer compound, a metal alkoxide, a silane coupling agent, and hydrolyzates thereof.

In one aspect, the inorganic oxide layer may contain silicon oxide.

In one aspect, the laminate may be used in a retort pouch.

On aspect of the present invention also provides a packaging bag obtained by forming the laminate into a bag.

Advantageous Effects of the Invention

The present invention can provide a laminate capable of high-temperature retort treatment when formed into a packaging bag even when composed mainly of a polyolefin-based film. The present invention can also provide a packaging bag using the laminate.

DETAILED DESCRIPTION

Figure 1:
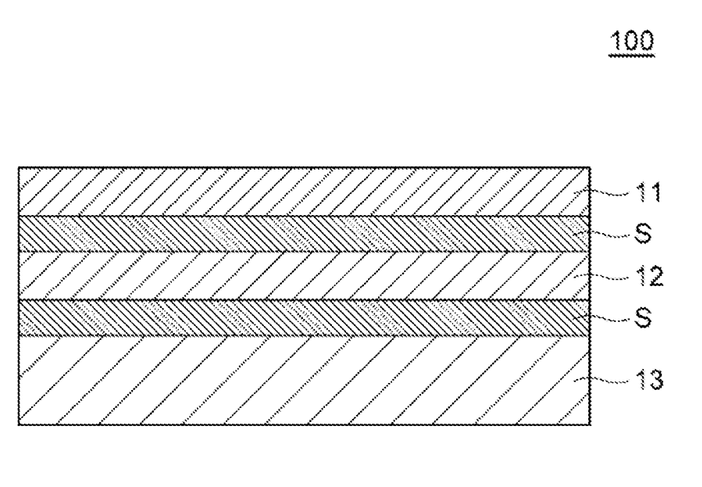
The FIGURE is a schematic cross-sectional view of a laminate film according to an embodiment.

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

<Laminate>

The FIGURE is a schematic cross-sectional view of a laminate according to an embodiment. A laminate 100 shown in the FIGURE includes a first base material layer 11, a second base material layer 12, and a sealant layer 13 in this order. The first base material layer 11 and the second base material layer 12, and the second base material layer 12 and the sealant layer 13 may be adhered to each other with an adhesive agent layer S. The first base material layer, the second base material layer and the sealant layer all include a polyolefin film. The polyolefin film of the first base material layer or the second base material layer includes an inorganic oxide layer on at least one surface thereof, for example, from the viewpoint of improving gas barrier performance against water vapor and oxygen. Since the polyolefin film including the inorganic oxide layer has gas barrier performance, such a first base material layer or a second base material layer can be referred to as a gas barrier base material layer. Each layer will now be described.

[First Base Material Layer 11]

The first base material layer is a film that serves as one support, and includes a polyolefin film. The first base material layer may be made of a polyolefin film. Examples of the polyolefin film include a polyethylene film (PE), a polypropylene film (PP), and a polybutene film (PB). The polyolefin film is, for example, an acid-modified polyolefin film obtained by graft-modifying a polyolefin with unsaturated carboxylic acid, an unsaturated carboxylic acid anhydride, an unsaturated carboxylic acid ester or the like.

The polyolefin film constituting the first base material layer may be a stretched film or a non-stretched film. However, the polyolefin film may be a stretched film from the viewpoints of impact resistance, heat resistance, water resistance, dimensional stability and the like. Thus, the laminate can be more preferably used in applications in which retort treatment or boiling treatment is performed. The stretching method is not particularly limited, and any method may be used as long as a film having stable dimensions can be supplied, including stretching by inflation, uniaxial stretching, or biaxial stretching.

The thickness of the polyolefin film is not particularly limited. Depending on the application, the thickness can be set to 6 to 200 μm, and may preferably be 9 to 50 μm or more preferably 12 to 38 μm from the viewpoint of obtaining improved or even excellent impact resistance and improved or even excellent gas barrier performance.

The polyolefin film may have a surface to be laminated that has undergone various pretreatments, such as corona treatment, plasma treatment, flame treatment and the like, to an extent not impairing barrier performance, or may be provided with a coating layer, such as an adhesive enhancement layer.

(Adhesive Layer)

When the polyolefin film includes an inorganic oxide layer, an adhesive layer (anchor coat layer) may be provided on the surface of the polyolefin film on which the inorganic oxide layer is laminated. The adhesive layer is provided on the polyolefin film, and two effects of improving the adhesion performance between the polyolefin film and the inorganic oxide layer and improving the smoothness of the surface of the polyolefin film can be obtained. By improving the smoothness, the inorganic oxide layer is easily formed uniformly without defects, and high barrier performance is easily developed. The adhesive layer can be formed by using an anchor coating agent.

Examples of the anchor coating agent include polyester-based polyurethane resins and polyether-based polyurethane resins. As the anchor coating agent, polyester-based polyurethane resins are preferred from the viewpoint of heat resistance and interlayer adhesion strength.

The thickness of the adhesive layer is not particularly limited, but preferably ranges from 0.01 μm to 5 μm, more preferably ranges from 0.03 μm to 3 μm, and even more preferably ranges from 0.05 μm to 2 μm. If the thickness of the adhesive layer is not less than the lower limit value indicated above, more sufficient interlayer adhesion strength tends to be obtained. On the other hand, when the thickness of the adhesive layer is not more than the upper limit value indicated above, the desired gas barrier performance tends to be easily developed.

The coating method for coating the adhesive layer on the polyolefin film is not particularly limited, and a known coating method can be used. Examples of the method include an immersion method (dipping method) and methods that use a sprayer, a coater, a printer, a brush, or the like. In addition, examples of the types of coaters and printers used in these methods, and the coating methods thereof may include a gravure coater, a reverse-roll coater, a micro gravure coater, a combined chamber and doctor coater, an air-knife coater, a dip coater, a bar coater, a comma coater, and a die coater for a direct gravure method, a reverse gravure method, a kiss reverse gravure method, an offset gravure method, and the like.

As the amount of the coating agent coated, the mass per square meter after coating and drying the anchor coating agent is preferably 0.01 to 5 g/m$^2$, and more preferably 0.03 to 3 g/m$^2$. If the mass per square meter after coating and drying the anchor coating agent is not less than the lower limit indicated above, the adhesive layer tends to be formed insufficiently. On the other hand, when the mass per square meter after coating and drying the anchor coating agent is not more than the upper limit indicated above, the adhesive layer tends to be dried sufficiently, and a solvent tends not to remain.

The method for drying the adhesive layer is not particularly limited, and examples thereof may include a method of drying naturally, a method of drying in an oven set at a predetermined temperature, and methods using drying machines attached to the coaters such as an arch dryer, a floating dryer, a drum dryer and an infrared ray dryer. Further, the drying conditions can be appropriately selected depending on the drying method. For example, in the method of drying in an oven, the adhesive layer is preferably dried at a temperature of 60 to 100° C. for about 1 second to 2 minutes.

As the adhesive layer, a polyvinyl alcohol-based resin can be used instead of the polyurethane resin. The polyvinyl alcohol-based resin may have a vinyl alcohol unit in which a vinyl ester unit is saponified, and examples thereof include polyvinyl alcohol (PVA) and an ethylene-vinyl alcohol copolymer (EVOH).

The PVA is, for example, a resin obtained by polymerizing a vinyl ester such as vinyl acetate, vinyl formate, vinyl propionate, vinyl valerate, vinyl caprate, vinyl laurate, vinyl stearate, vinyl pivalate, or vinyl versatate alone and then saponifying the resultant homopolymer. The PVA may be a modified PVA subjected to copolymerization-modification or post-modification. The modified PVA can be obtained, for example, by copolymerizing a vinyl ester with an unsaturated monomer copolymerizable with the vinyl ester and then saponifying the resultant copolymer. Examples of unsaturated monomers copolymerizable with vinyl esters include ethylenes such as ethylene, propylene, isobutylene, α-octene, α-dodecene and α-octadecene; hydroxy group-containing α-olefins such as 3-butene-1-ol and 4-pentyn-1-ol, 5-hexen-1-ol; unsaturated acids such as acrylic acid, methacrylic acid, crotonic acid, maleic acid, maleic anhydride, itaconic acid, and undecylenic acid; nitriles such as acrylonitrile and meta-acrylonitrile; amides such as diacetone acrylamide, acrylamide and methacrylamide; olefin sulfonic acids such as ethylene sulfonic acid, allyl sulfonic acids and metaallyl sulfonic acids; vinyl compounds such as alkyl vinyl ethers, dimethyl allyl vinyl ketones, N-vinylpyrrolidone, vinyl chloride, vinyl ethylene carbonate, 2,2-dialkyl-4-vinyl-1,3-dioxolane, glycerin monoallyl ethers, 3,4-diacetoxy-1-butene; vinylidene chloride, 1,4-diacetoxy-2-butene, and vinylidene carbonate.

The polymerization degree of the PVA is preferably 300 to 3000. If the polymerization degree is less than 300, the barrier properties tend to decrease. If the polymerization degree is larger than 3000, the viscosity is too high, and the coating suitability easily decreases. The saponification degree of the PVA is preferably 90 mol % or more, more preferably 95 mol % or more, and further preferably 99 mol % or more. Also, the saponification degree of the PVA may be 100 mol % or less or 99.9 mol % or less. The polymerization degree and saponification degree of the PVA can be measured according to the methods described in JIS K6726 (1994).

The EVOH is generally obtained, for example, by saponifying a copolymer of an ethylene with an acid vinyl ester such as vinyl acetate, vinyl formate, vinyl propionate, vinyl valerate, vinyl caprate, vinyl laurate, vinyl stearate, vinyl pivalate, or vinyl versatate.

The polymerization degree of the EVOH is preferably 300 to 3000. If the polymerization degree is less than 300, the barrier properties tend to decrease. If the polymerization degree is larger than 3000, the viscosity is too high, and the coating suitability easily decreases. The saponification degree of the vinyl ester component of the EVOH is preferably 90 mol % or more, more preferably 95 mol % or more, and further preferably 99 mol % or more. Also, a saponification degree of the EVOH may be 100 mol % or less or 99.9 mol % or less. The saponification degree of the EVOH is determined from a peak area of hydrogen atoms contained in the vinyl ester structure and a peak area of hydrogen atoms contained in the vinyl alcohol structure through nuclear magnetic resonance (1H-NMR) measurement.

An ethylene unit content of the EVOH is 10 mol % or more, more preferably 15 mol % or more, further preferably 20 mol % or more, and particularly preferably 25 mol % or more. The ethylene unit content of the EVOH is preferably 65 mol % or less, more preferably 55 mol % or less, and further preferably 50 mol % or less. When the ethylene unit content is 10 mol % or more, the gas barrier performance or dimensional stability under high humidity can be kept good. On the other hand, when the ethylene unit content is 65 mol % or less, the gas barrier performance can be enhanced. The ethylene unit content of the EVOH can be determined by the NMR method.

When a polyvinyl alcohol-based resin is used as the adhesive layer, examples of the method for forming the adhesive layer include coating with a polyvinyl alcohol-based resin solution, and multilayer extrusion.

(Inorganic Oxide Layer)

When the polyolefin film includes an inorganic oxide layer, examples of an inorganic oxide contained in the inorganic oxide layer include aluminum oxide, silicon oxide, magnesium oxide, and tin oxide. From the viewpoint of transparency and barrier performance, the inorganic oxide may be selected from the group consisting of aluminum oxide, silicon oxide, and magnesium oxide. Further, from the viewpoint of improved or even excellent tensile stretchability during processing, the inorganic oxide layer is preferably a layer using silicon oxide. By using the inorganic oxide layer, high barrier performance can be obtained with a very thin layer that does not affect the recyclability of the laminate.

An O/Si ratio of the inorganic oxide layer is preferably 1.7 or more. When the O/Si ratio is 1.7 or more, a content ratio of metal Si is suppressed, and good transparency can be easily obtained. Further, the O/Si ratio is preferably 2.0 or less. When the O/Si ratio is 2.0 or less, the crystallinity of SiO becomes high, thereby making it possible to prevent the inorganic oxide layer from becoming too hard, and good tensile resistance can be obtained. Thus, it is possible to prevent cracks from occurring in the inorganic oxide layer when the gas barrier coating layer is laminated. Further, the polyolefin film may shrink due to heat during boiling or retort treatment even after molding into a packaging bag, but the O/Si ratio of 2.0 or less makes it easy for the inorganic oxide layer to follow the shrinkage, and to suppress deterioration in barrier performance. From the viewpoint of obtaining these effects more sufficiently, the O/Si ratio of the inorganic oxide layer is preferably 1.75 or more and 1.9 or less, and more preferably 1.8 or more and 1.85 or less.

The O/Si ratio of the inorganic oxide layer can be determined by X-ray photoelectron spectroscopy (XPS). The O/Si ratio can be measured, for example, by using an X-ray photoelectron spectroscopy analyzer (JPS-90MXV, produced by JEOL Ltd.) as a measurement device and non-monochromatic MgKα (1253.6 eV) as an X-ray source, with an X-ray output of 100 W (10 kV-10 mA). For quantitative analysis for obtaining the O/Si ratio, relative sensitivity factors of 2.28 for O1s and 0.9 for Si2p, respectively, can be used.

The film thickness of the inorganic oxide layer is preferably 10 nm or more and 50 nm or less. When the film thickness is not less than 10 nm, sufficient water vapor barrier performance can be obtained. Further, when the film thickness is 50 nm or less, it is possible to suppress cracks from occurring due to the deformation of the thin film by internal stress, and to suppress deterioration in water vapor barrier performance. It should be noted that if the film thickness is more than 50 nm, the cost is likely to increase due to an increase in amount of material used, an increase in length of the film formation time and the like, which is not preferable from an economic aspect. The film thickness of the inorganic oxide layer is preferably 20 nm or more and 40 nm or less from the same viewpoint as above.

The inorganic oxide layer can be formed by vacuum film formation, for example. In the vacuum film formation, a physical vapor deposition method or a chemical vapor deposition method can be used. Examples of the physical vapor deposition method may include, but are not limited to, a vacuum vapor deposition method, a sputtering method, and an ion plating method. Examples of the chemical vapor deposition method include, but are not limited to, a thermal CVD method, a plasma CVD method, an optical CVD method, and the like.

In the vacuum film formation, resistance heating vacuum deposition, electron beam (EB) heating vacuum deposition, induction heating vacuum deposition, sputtering, reactive sputtering, dual magnetron sputtering, plasma chemical vapor deposition (PECVD) and the like are preferably used. However, considering productivity, the vacuum vapor deposition method is currently the best. As a heating means for the vacuum vapor deposition method, any of electron beam heating, resistance heating and induction heating methods is preferably used.

(Gas Barrier Coating Layer)

The polyolefin film may include a gas barrier coating layer on the inorganic oxide layer. The gas barrier coating layer is formed using a composition for forming a gas barrier coating layer containing at least one selected from the group consisting of a hydroxyl group-containing polymer compound, a metal alkoxide, a silane coupling agent, and hydrolyzates thereof.

The gas barrier coating layer is a coating layer having gas barrier performance, and is formed using a composition for forming a gas barrier coating layer (hereinafter, also referred to as a coating agent) containing, as a main component, an aqueous solution or a water/alcohol mixed solution containing at least one selected from the group consisting of a hydroxyl group-containing polymer compound, a metal alkoxide, a silane coupling agent, and hydrolyzates thereof. The coating agent preferably contains at least a silane coupling agent or a hydrolyzate thereof from the viewpoint of more sufficiently maintaining the gas barrier performance after hot water treatment such as retort treatment, more preferably contains at least one selected from the group consisting of a hydroxyl group-containing polymer compound, a metal alkoxide and hydrolyzates thereof, and a silane coupling agent or a hydrolyzate thereof, and further preferably contains a hydroxyl group-containing polymer compound or a hydrolyzate thereof, a metal alkoxide or a hydrolyzate thereof, and a silane coupling agent or a hydrolyzate thereof. The coating agent can be prepared, for example, by directly mixing a metal alkoxide and a silane coupling agent, or mixing a product obtained by treating (for example, hydrolyzing) a metal alkoxide and a silane coupling agent in advance, in a solution in which a hydroxyl group-containing polymer compound, which is a water-soluble polymer, is dissolved in an aqueous (water or water/alcohol mixed) solvent.

Each component contained in the coating agent for forming the gas barrier coating layer will be described in detail. The hydroxyl group-containing polymer compounds that can be used for the coating agent include polyvinyl alcohol, polyvinylpyrrolidone, starch, methyl cellulose, carboxy methyl cellulose, and sodium alginate. Among these, polyvinyl alcohol (PVA) is preferred because it has particularly improved or even excellent gas barrier performance when used as the coating agent for the gas barrier coating layer.

The gas barrier coating layer is preferably formed from a composition containing at least one selected from the group consisting of a metal alkoxide represented by the following formula (I) and a hydrolysate thereof, from the viewpoint of obtaining improved or even excellent gas barrier performance.

$$M(OR^1)_m(R^2)_{n-m} \quad (I)$$

In formula (I), $R^1$ and $R^2$ are each independently a monovalent organic group having 1 to 8 carbon atoms, and are preferably an alkyl group such as a methyl group or an ethyl group. M represents an n-valent metal atom such as Si, Ti, Al or Zr. Furthermore, m represents an integer from 1 to n. When a plurality of $R^1$s or $R^2$s exist, the $R^1$s or the $R^2$s may be identical with or different from each other.

Specific examples of the metal alkoxide include tetraethoxysilane [$Si(OC_2H_5)_4$] and aluminum triisopropoxide [$Al(O\text{-iso-}C_3H_7)_3$]. Tetraethoxysilane and triisopropoxy aluminum are preferred because they are relatively stable in an aqueous solvent after being hydrolyzed.

An example of the silane compound is a compound represented by the following formula (II).

$$Si(OR^{11})_p(R^{12})_{3-p}R^{13} \quad (II)$$

In formula (II), $R^{11}$ represents an alkyl group such as a methyl group or an ethyl group; $R^{12}$ represents an alkyl group substituted with an alkyl group, an aralkyl group, an aryl group, an alkenyl group or an acryloxy group, or a monovalent organic group such as an alkyl group substituted with a methacryloxy group; $R^{13}$ represents a monovalent organic functional group; and p represents an integer of 1 to 3. When a plurality of $R^{11}$s or $R^{12}$s exist, the $R^{11}$s or the $R^{12}$s may be identical with or different from each other. An example of the monovalent organic functional group represented by $R^{13}$ is a monovalent organic functional group containing a glycidyloxy group, an epoxy group, a mercapto group, a hydroxyl group, an amino group, an alkyl group substituted with a halogen atom, or an isocyanate group.

Specific examples of the silane coupling agent include silane coupling agents such as vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, and γ-methacryloxypropylmethyldimethoxysilane.

Further, the silane coupling agent may be a multimer obtained by polymerizing the compound represented by formula (II). The multimer is preferably a trimer, and more preferably 1,3,5-tris (3-trialkoxysilylalkyl) isocyanurate. This is a condensation polymer of 3-isocyanate alkyl alkoxysilane. This 1,3,5-tris (3-trialkoxysilylalkyl) isocyanurate has no chemical reactivity in the isocyanate moiety, but is known to ensure reactivity by the polarity of the isocyanurate ring moiety. Generally, like 3-isocyanate alkyl alkoxysilane, 1,3,5-tris (3-trialkoxysilylalkyl) isocyanurate is added to an adhesive agent or the like, and is known as an adhesion improving agent. Therefore, by adding 1,3,5-tris (3-trialkoxysilylalkyl) isocyanurate to a hydroxyl group-containing polymer compound, the water resistance of the gas barrier coating layer can be improved by hydrogen bonding. Even though 3-isocyanate alkyl alkoxysilane has high reactivity and low liquid stability, the isocyanurate ring moiety of 1,3,5-tris (3-trialkoxysilylalkyl) isocyanurate is not water soluble due to the polarity, however, 1,3,5-tris (3-trialkoxysilylalkyl) isocyanurate is easily dispersed in an aqueous solution, and the viscosity can be stably maintained. In addition, the water resistance performance of 3-isocyanate alkyl alkoxysilane is equivalent to that of 1,3,5-tris (3-trialkoxysilylalkyl) isocyanurate.

Some 1,3,5-tris (3-trialkoxysilylalkyl) isocyanurate is produced by thermal condensation of 3-isocyanate alkyl alkoxysilane and in some cases 3-isocyanate alkyl alkoxysilane of the base material is included, however this poses no particular problem. More preferable is 1,3,5-tris (3-trialkoxysilylpropyl) isocyanurate, and even more preferable is 1,3,5-tris (3-trimethoxysilylpropyl) isocyanurate. 1,3,5-tris (3-trimethoxysilylpropyl) isocyanurate is practically advantageous because this methoxy group has a fast hydrolysis rate, and those including a propyl group can be obtained at a comparatively low price.

In addition, a known additive such as an isocyanate compound, a dispersant, a stabilizer, a viscosity modifier, or a colorant may be added as necessary to the coating agent as long as the gas barrier performance is not impaired.

The gas barrier coating layer preferably has a thickness in the range of 50 nm to 1,000 nm, and more preferably 100 nm to 500 nm. When the thickness of the gas barrier coating layer is 50 nm or more, more sufficient gas barrier performance tends to be obtained, and when the thickness of the gas barrier coating layer is 1,000 nm or less, sufficient flexibility tends to be retained.

A coating liquid for forming the gas barrier coating layer can be coated, for example, by dipping, roll coating, gravure coating, reverse gravure coating, air knife coating, comma coating, die coating, screen printing, spray coating, gravure offset or the like. The coating film obtained by coating this coating liquid can be dried, for example, by a hot air drying method, a hot roll drying method, a high frequency irradiation method, an infrared irradiation method, a UV irradiation method, or a combination thereof.

The temperature at which the coating film is dried can be, for example, a temperature of 50 to 150° C., and is preferably a temperature of 70 to 100° C. By setting the temperature during drying within the above range, it is possible to further suppress the generation of cracks in the inorganic oxide layer and the gas barrier coating layer, and improved or even excellent barrier performance can be developed.

The gas barrier coating layer may be formed by using a coating agent containing a polyvinyl alcohol-based resin and a silane compound. An acid catalyst, an alkali catalyst, a photoinitiator, or the like may be added to the coating agent, as needed.

The polyvinyl alcohol-based resin is as described above. Also, the silane compound is, for example, a silane coupling agent, polysilazane, siloxane, or the like, and specific examples thereof include tetramethoxysilane, tetraethoxysilane, glycidoxypropyltrimethoxysilane, acryloxypropyltrimethoxysilane, and hexamethyldisilazane.

(Printed Layer)

A printed layer can be provided on the second base material layer side of the first base material layer. The printed layer is provided at a position visible from the outside of the laminate for the purpose of displaying information about the contents, identifying the contents, or improving the design of the packaging bag. The printing method and printing ink are not particularly limited, and are appropriately selected from known printing methods and printing inks in consideration of printability on a film, design such as color tone, adhesion, safety as a food container, and the like. As the printing method, a gravure printing, an offset printing, a gravure offset printing, a flexographic printing, an inkjet printing or the like can be used. Above all, the gravure printing can be preferably used from the viewpoint of productivity and high definition of a pattern.

In order to improve the adhesion of the printed layer, the surface on the second base material layer side of the first base material layer may undergo various pretreatments, such as corona treatment, plasma treatment, flame treatment and the like, or may be provided with a coating layer, such as an adhesive enhancement layer. The surface on the second base material layer side of the first base material layer is, for example, a surface of the polyolefin film (when the first base material layer is not the gas barrier base material layer) or a surface of the gas barrier coating layer (when the first base material layer is a gas barrier base material layer).

[Second Base Material Layer 12]

As for the structure of the second base material layer, the contents described regarding the structure of the first base material layer can be appropriately referred to. When the first base material layer is a gas barrier base material layer, the second base material layer does not have to be a gas barrier base material layer, and, conversely, when the second base material layer is a gas barrier base material layer, the first base material layer does not have to be a gas barrier base material layer.

(Adhesive Agent Layer S)

The first base material layer and the second base material layer can be laminated via an adhesive agent layer. The usable material for the adhesive agent is, for example, a polyester-isocyanate-based resin, a urethane resin, or a polyether-based resin. In order to use the packaging bag for retort applications, a retort-resistant two-component curable urethane-based adhesive agent can be preferably used.

[Sealant Layer 13]

A sealant layer imparts sealability to the laminate when heat-sealed, and includes a polyolefin film. The sealant layer may be made of a polyolefin film.

Among thermoplastic resins, a polyolefin-based resin is commonly used as the material for the sealant layer, and specific examples thereof include a low-density polyethylene resin (LDPE), a medium-density polyethylene resin (MDPE), a linear low-density polyethylene resin (LLDPE), an ethylene-vinyl acetate copolymer (EVA), an ethylene-α-olefin copolymer, an ethylene-(meth)acrylic acid resin copolymer, a blended resin of polyethylene and polybutene, a homopolypropylene resin (PP), a propylene-ethylene random copolymer, a propylene-ethylene block copolymer, a propylene-α-olefin copolymer, and other polypropylene-based resins. These thermoplastic resins can be appropriately selected depending on the intended use and temperature conditions such as boiling and retort treatment.

The polyolefin film constituting the sealant layer may be added with various types of additives such as a flame retardant, a slip agent, an anti-blocking agent, an antioxidant, a light stabilizer and a tackifier.

The thickness of the sealant layer is determined by the mass of the contents, the shape of the packaging bag, and the like, and is preferably about 30 to 150 μm.

The sealant layer can be formed by any known lamination method such as a dry laminating method in which film-shaped sealant layers made of the thermoplastic resin described above are bonded together with an adhesive agent such as a one-component curable or two-component curable urethane-based adhesive agent; a non-solvent dry laminating method in which film-shaped sealant layers are bonded together using a solvent-free adhesive agent; or an extrusion laminating method in which the thermoplastic resin is heated and melted, and extruded into a curtain, and the curtains are bonded together, as a method for forming the sealant layer.

Among the formation methods, the dry laminating method is preferred because it provides high resistance to retort treatment, particularly high-temperature hot water treatment at 120° C. or higher. On the other hand, the laminating method is not particularly limited as long as it is used for the purpose of treating the packaging bag at a temperature of 85° C. or lower.

[Heat Shrinkage Rate of Each Layer]

For each of the first base material layer, the second base material layer and the sealant layer of the laminate described above, the heat shrinkage rate in a travel direction (MD direction) after heating at 120° C. for 15 minutes satisfies the following inequalities.

Heat shrinkage rate of the second base material layer≤5%   (Inequality 1)

Heat shrinkage rate of the second base material layer≥Heat shrinkage rate of the first base material layer   (Inequality 2)

Heat shrinkage rate of the second base material layer≥Heat shrinkage rate of the sealant layer   (Inequality 3)

In the inequalities, the heat shrinkage rate (%) is a value calculated by the following expression.

(Travel-direction length before heating−Travel-direction length after heating)/Travel-direction length before heating×100

The procedures for measuring the heat shrinkage rates are as follows.

(1) Cut a layer to be measured into a size of 20 cm×20 cm and use the cut piece as a measurement sample.
(2) Draw a 10-cm line in the travel direction of the measurement sample (travel-direction length before heating).
(3) Heat the measurement sample at 120° C. for 15 minutes.
(4) Measure the travel-direction length of the drawn line (travel-direction length after heating).
(5) Calculate the heat shrinkage rate from the above expression.

The heat shrinkage rate of the second base material layer is 5% or less. Due to this heat shrinkage rate, cracks are less likely to be generated in the gas barrier coating layer during barrier processing, and thus the barrier performance is good. From this viewpoint, the heat shrinkage rate can be set to 4% or less, and may be 3% or less. In addition, since it takes time for heat setting (heat fixation) in order to form a film having a very small heat shrinkage rate, the productivity is significantly deteriorated. From this viewpoint, the heat shrinkage rate of the second base material layer can be set to 1.5% or more.

The heat shrinkage rate of the second base material layer is equal to or higher than the heat shrinkage rate of the first base material layer and equal to or higher than the heat shrinkage rate of the sealant layer. By sandwiching and laminating the second base material layer between the first base material layer and the sealant layer each having a heat shrinkage rate smaller than that of the heat shrinkage rate of the second base material layer, the heat shrinkage rate of the laminate can be reduced. As a result, the reduction in gas barrier function during the retort treatment is suppressed, and thus the barrier performance after the retort treatment can be maintained. From this viewpoint, the heat shrinkage rate of the second base material layer−the heat shrinkage rate of the first base material layer can be set to 0.3% or more, and may be 0.5% or more. If the heat shrinkage rate of the second base material layer is higher than that of the first base material layer by a certain amount or more, it becomes difficult to obtain the effect of reducing the shrinkage rate of the laminate. This results in difficulty in suppressing the reduction in gas barrier function. Therefore, the upper limit of the heat shrinkage rate of the second base material layer−the heat shrinkage rate of the first base material layer can be 1.5% or less. The heat shrinkage rate of the second base material layer−the heat shrinkage rate of the sealant layer can be set to 0.5% or more, and may be 1.0% or more. If the heat shrinkage rate of the second base material layer is higher than that of the sealant layer by a certain amount or more, it becomes difficult to obtain the effect of reducing the shrinkage rate of the laminate. This results in difficulty in suppressing the reduction in gas barrier function. Therefore, the upper limit of the heat shrinkage rate of the second base material layer−the heat shrinkage rate of the sealant layer can be 3.0% or less.

The heat shrinkage rate of the sealant layer can be set to 2% or less. This makes it easier to suppress the heat shrinkage of the laminate. From this viewpoint, the heat shrinkage rate may be 1% or less.

As described above, all the films constituting the laminate can be polyolefin films. Such a laminate can be said to be a (mono material) packaging material made of a single material, having improved or even excellent recyclability. From this viewpoint, the total mass of the components (for example, the adhesive agent and the ink component) other than the polyolefin component can be set to 10 mass % or less, and may be 7.5 mass % or less, based on the total mass of the laminate.

In addition, the laminate can be subjected to high-temperature retort treatment when used as a packaging bag, and can be suitably used for retort pouch applications.

<Packaging Bag>

The packaging bag is obtained by forming the laminate described above into a bag. The packaging bag may be obtained by folding one laminate in half so that the portions of the sealant layer face each other and then heat-sealing the folded laminate on three sides to form a bag shape, or may be obtained by superposing two laminates so that the sealant layers face each other and then heat-sealing the four sides of the superposed laminates to form a bag shape. The packaging bag can contain food products, medicinal products and other contents, and can be subjected to heat sterilization treatments such as retort treatment and boiling treatment.

Retort treatment is a general method of performing pressure sterilization against microorganisms such as mold, yeast, bacteria and the like for preserving food products, medicinal products and the like. Normally, the packaging bag that packages a food product or the like is pressure sterilized for 10 to 120 minutes under conditions of 105 to 140° C. and 0.15 to 0.30 MPa. There are steam type retort apparatuses that utilize heated steam, and there are hot-water type retort apparatuses that utilize pressurized heated water; with each type being appropriately used according to the sterilization conditions of the food product contents. Boiling treatment is a method of performing moist-heat sterilization for preserving food products, medicinal products and the like. Usually, a food product or the like packaged by the packaging bag is subjected to moist-heat sterilization for 10 to 120 minutes at 60° C. to 100° C. and atmospheric pressure, although it depends on the contents. Normally, boiling treatment is performed at a temperature of 100° C. or lower using a hot-water tank. As the method used, there is a batch type method of immersing a package in a hot-water tank at a constant temperature and removing the package after treatment has been performed for a set amount of time, and there is a continuous method by which a package is treated by passing the package through a hot-water tank using a tunnel method.

The packaging bag can be particularly used suitably for applications in which retort treatment is performed at a temperature of 120° C. or higher. The packaging bag using the laminate described above can maintain improved or even excellent barrier performance even when it is subjected to retort treatment.

EXAMPLES

The present disclosure will be described in more detail with reference to the following examples, but is not limited to these examples.
<Preparation of First Base Material Layer and Second Base Material Layer>

The following stretched polypropylene films were prepared as the first base material layer and the second base material layer. The "shrinkage rate" is a heat shrinkage rate in a travel direction (MD direction) after heating at 120° C. for 15 minutes.
[First Base Material Layer]
    OPP (shrinkage rate of 2.0%): thickness of 20 μm
    OPP (shrinkage rate of 3.1%): thickness of 20 μm
    OPP (shrinkage rate of 4.1%): thickness of 20 μm
    EVOH-OPP (shrinkage rate of 2.0%): thickness of 18 in which an EVOH layer (adhesive layer) was provided on an OPP film.
[Second Base Material Layer]
    OPP (shrinkage rate of 2.6%): thickness of 20 μm
    OPP (shrinkage rate of 2.6%): thickness of 18 μm
    OPP (shrinkage rate of 3.8%): thickness of 20 μm
    EVOH-OPP (shrinkage rate of 2.6%): thickness of 18 in which an EVOH layer (adhesive layer) was provided on an OPP film.

The method for producing the gas barrier base material layer is as follows.
[Preparation of Composition for Forming Adhesive Layer]

Acrylic polyol was mixed with tolylene diisocyanate so that the number of NCO groups in the tolylene diisocyanate becomes equivalent to the number of OH groups in the acrylic polyol, and the mixture was diluted with ethyl acetate so that the total solid content (total amount of the acrylic polyol and the tolylene diisocyanate) was 5 mass %. To the mixed liquid after dilution, β-(3,4-epoxycyclohexyl)trimethoxysilane was further added in an amount of 5 parts by mass relative to 100 parts by mass of the total amount of the acrylic polyol and the tolylene diisocyanate, and these compounds were mixed to prepare a composition for forming an adhesive layer (anchor coating agent),
[Preparation of Composition for Forming Gas Barrier Coating Layer]

The following liquids A, B and C were mixed at a mass ratio of 65/25/10, respectively, to prepare a composition for forming a gas barrier coating layer.

Liquid A: Hydrolyzed solution of a solid content of 5 mass % (equivalent to $SiO_2$) obtained by adding 72.1 g of 0.1 N hydrochloric acid to 17.9 g of tetraethoxysilane ($Si(OC_2H_5)_4$) and 10 g of methanol, and stirring for 30 minutes for hydrolysis
    Liquid B: Water/methanol solution containing 5 mass % of polyvinyl alcohol (water:methanol=95:5 (by mass))
    Liquid C: Hydrolyzed solution obtained by diluting 1,3,5-tris (3-trialkoxysilylpropyl) isocyanurate with a water/isopropyl alcohol mixed liquid (water:isopropyl alcohol=1:1 (by mass)) to a solid content of 5 mass % by mass
[Production of Gas Barrier OPP]

The composition for forming an adhesive layer was coated to the corona-treated surface of the stretched polypropylene film by a gravure roll coating method, and dried and cured at 60° C., thereby forming an adhesive layer made of a polyester-based polyurethane resin, having a coating amount of 0.1 g/m². Next, a transparent inorganic oxide layer (silica vapor deposition layer) made of silicon oxide, having a thickness of 30 nm, was formed by a vacuum vapor deposition device using an electron beam heating method. As the silica vapor deposition layer, the vapor deposition material type was adjusted to form a vapor deposition layer having an O/Si ratio of 1.8. The O/Si ratio was measured by using an X-ray photoelectron spectroscopy analyzer (JPS-90MXV, produced by JEOL Ltd.) and non-monochromatized MgKα (1253.6 eV) as an X-ray source, with an X-ray output of 100 W (10 kV-10 mA). For quantitative analysis for obtaining the O/Si ratio, relative sensitivity factors of 2.28 for O1s and 0.9 for Si2p, respectively, were used.

When an alumina vapor deposition layer was formed as the inorganic oxide layer, the procedures therefor are as follows. Using an electron beam type vacuum vapor deposition method, aluminum was evaporated while introducing oxygen to form an AlOx vapor deposition film having a thickness of 10 nm.

Next, the composition for forming a gas barrier coating layer was coated onto the inorganic oxide layer by the gravure roll coating method, and heated and dried in an oven under the conditions of a tension of 20 N/m and a drying temperature of 120° C. to form a gas barrier coating layer having a thickness of 0.3 Thus, a gas barrier film having a laminated structure of film base material/adhesive layer/inorganic oxide layer/gas barrier coating layer was obtained.
[Production of Gas Barrier EVOH-OPP]

An inorganic oxide layer (silica vapor deposition layer) was formed on the EVOH layer (adhesive layer) of the EVOH-OPP film in the same manner as described above. Next, in the same manner as described above, a gas barrier coating layer was formed on the inorganic oxide layer using the composition for forming a gas barrier coating layer. Thus, a gas barrier film having a laminated structure of film base material/EVOH layer (adhesive layer)/inorganic oxide layer/gas barrier coating layer was obtained.
<Preparation of Sealant Layer>

The following polypropylene films were prepared as the sealant layer.
    CPP (shrinkage rate of 0.2%): thickness of 70
    CPP (shrinkage rate of 1.8%): thickness of 70
<Measurement of Shrinkage Rate of Each Layer>

The heat shrinkage rate (%) for each layer was measured according to the following procedures.
    (1) A layer to be measured was cut into a size of 20 cm×20 cm, and the cut piece was used as a measurement sample.

(2) A 10-cm line was drawn in the travel direction of the measurement sample (travel-direction length before heating).
(3) The measurement sample was heated at 120° C. for 15 minutes.
(4) The travel-direction length of the drawn line was measured (travel-direction length after heating).
(5) The heat shrinkage rate was calculated from the following expression.

(Travel-direction length before heating−Travel-direction length after heating)/Travel-direction length before heating×100

<Production of Laminate>

Based on combinations of the layers indicated in Table 1, laminates of the examples and the comparative examples were produced. The methods for producing the laminates are as follows.

Example 1

The first base material layer was laminated on the corona-treated surface of the second base material layer, by a dry laminating method, via a two-component adhesive agent (product name: A525 (main component)/A52 (curing agent) manufactured by Mitsui Chemicals, Inc.). In addition, the sealant layer was similarly laminated on the non-corona-treated surface of the second base material layer. The gas barrier coating layer (barrier surface) of the first base material layer was the second base material layer-side surface. Thus, a laminate having a laminated structure of first base material layer (gas barrier base material layer)/adhesive agent layer/second base material layer/adhesive agent layer/sealant layer was produced.

Example 2

The first base material layer was laminated on the gas barrier coating layer of the second base material layer, by the dry laminating method, via the two-component adhesive agent described above. In addition, the sealant layer was similarly laminated on the non-corona-treated surface of the second base material layer. Thus, a laminate having a laminated structure of first base material layer/adhesive agent layer/second base material layer (gas barrier base material layer)/adhesive agent layer/sealant layer was produced.

Example 7

A laminate was produced in the same manner as in Example 2 except that the combinations of the layers were changed as indicated in Table 1 and that the second base material layer was laminated so that the gas barrier coating layer was the sealant layer-side surface.

Comparative Examples 4 and 5

Laminates were produced in the same manner as in Example 2 except that the combinations of the layers were changed as indicated in Table 1, that the second base material layer was laminated so that the gas barrier coating layer was the sealant layer-side surface, and that no first base material layer was laminated.

OTHER EXAMPLES AND COMPARATIVE EXAMPLES

Laminates were produced in the same manner as in Example 1 or Example 2 except that the combinations of the layers were changed as indicated in Table 1.

| | Layer structure | | | | | | | |
|---|---|---|---|---|---|---|---|---|
| | First base material layer | | Second base material layer | | Sealant layer | | Gas barrier coating layer | |
| | Material | Shrinkage rate | Material | Shrinkage rate | Material | Shrinkage rate | Barrier surface | Vapor deposition layer |
| Example 1 | Gas barrier OPP | 3.1 | OPP | 3.8 | CPP | 1.8 | Second base material layer side | Silica |
| Example 2 | OPP | 3.1 | Gas barrier OPP | 3.8 | CPP | 1.8 | First base material layer side | Silica |
| Example 3 | Gas barrier OPP | 2.0 | OPP | 2.6 | CPP | 1.8 | Second base material layer side | Silica |
| Example 4 | OPP | 2.0 | Gas barrier OPP | 2.6 | CPP | 1.8 | First base material layer side | Silica |
| Example 5 | Gas barrier OPP | 2.0 | OPP | 2.6 | CPP | 0.2 | Second base material layer side | Silica |
| Example 6 | OPP | 2.0 | Gas barrier OPP | 2.6 | CPP | 0.2 | First base material layer side | Silica |
| Example 7 | OPP | 2.0 | Gas barrier OPP | 2.6 | CPP | 0.2 | Sealant layer side | Silica |
| Example 8 | Gas barrier EVOH-OPP | 2.0 | OPP | 2.6 | CPP | 0.2 | Second base material layer side | Silica |

-continued

| | First base material layer | | Second base material layer | | Sealant layer | | Gas barrier coating layer | |
|---|---|---|---|---|---|---|---|---|
| | Material | Shrinkage rate | Material | Shrinkage rate | Material | Shrinkage rate | Barrier surface | Vapor deposition layer |
| Example 9 | OPP | 2.0 | Gas barrier EVOH-OPP | 2.6 | CPP | 0.2 | First base material layer side | Silica |
| Example 10 | OPP | 2.0 | Gas barrier OPP | 2.6 | CPP | 0.2 | First base material layer side | Alumina |
| Comparative Example 1 | OPP | 4.1 | Gas barrier OPP | 3.8 | CPP | 1.8 | First base material layer side | Silica |
| Comparative Example 2 | OPP | 4.1 | Gas barrier OPP | 3.8 | CPP | 0.2 | First base material layer side | Silica |
| Comparative Example 3 | OPP | 4.1 | Gas barrier OPP | 2.6 | CPP | 0.2 | First base material layer side | Silica |
| Comparative Example 4 | — | — | Gas barrier OPP | 2.6 | CPP | 0.2 | Sealant layer side | Silica |
| Comparative Example 5 | — | — | Gas barrier EVOH-OPP | 2.6 | CPP | 0.2 | Sealant layer side | Silica |

<Production of Packaging Bag>

The laminate obtained in each example was cut into a size of 15 cm×10 cm, and the two cut packaging films were superposed so that their sealant layers faced each other. The two superposed packaging films were impulse-sealed on three sides in a pouch shape. Thereafter, 100 ml of tap water was introduced as the content in the pouch, and the remaining one side was impulse-sealed. As a result, a four-side sealed pouch (packaging bag) was prepared.

<Evaluation of Gas Barrier Performance>

The pouch obtained in each example was subjected to retort treatment using a retort apparatus at 0.2 MPa and 121° C. for 30 minutes. After the retort treatment, the tap water contained in the pouch was discarded, and the gas barrier performance was evaluated in a state where the pouch was sufficiently dried. Specifically, oxygen transmission rate (OTR) and the water vapor transmission rate (WTR) were measured as follows. The results are indicated in Table 2.

Oxygen transmission rate: measured by using oxygen transmission rate measurement device (trade name: OX-TRAN2/20, manufactured by MOCON) under the conditions: temperature of 30° C. and relative humidity of 70% (JIS K-7126, Method B).

The measurement values are expressed in the unit [cc/m$^2$·day·MPa].

Water vapor transmission rate: measured by using water vapor transmission rate measurement device (trade name: PERMATRAN-W3/33, manufactured by MOCON) under the conditions: temperature of 40° C. and relative humidity of 90% (JIS K-7126, Method B).

The measured values are expressed in the unit [g/(m$^2$·day)].

TABLE 2

| | Shrinkage rate difference (second base material − first base material) | Shrinkage rate difference (second base material − sealant) | Performance evaluation After retort | |
|---|---|---|---|---|
| | | | OTR | WTR |
| Example 1 | 0.7 | 2.0 | 8.0 | 3.0 |
| Example 2 | 0.7 | 2.0 | 8.0 | 3.0 |
| Example 3 | 0.6 | 0.8 | 6.0 | 2.5 |
| Example 4 | 0.6 | 0.8 | 6.0 | 2.5 |
| Example 5 | 0.6 | 2.4 | 3.0 | 2.0 |
| Example 6 | 0.6 | 2.4 | 3.0 | 2.0 |
| Example 7 | 0.6 | 2.4 | 3.0 | 2.0 |
| Example 8 | 0.6 | 2.4 | 1.0 | 1.5 |
| Example 9 | 0.6 | 2.4 | 1.0 | 1.5 |
| Example 10 | 0.6 | 2.4 | 10.0 | 4.0 |
| Comparative Example 1 | −0.3 | 2.0 | 50.0 | 4.0 |
| Comparative Example 2 | −0.3 | 3.6 | 30.0 | 4.0 |
| Comparative Example 3 | −1.5 | 2.4 | 15.0 | 3.0 |
| Comparative Example 4 | — | 2.4 | 60.0 | 4.0 |
| Comparative Example 5 | — | 2.4 | 40.0 | 4.0 |

INDUSTRIAL APPLICABILITY

The laminate according to the present invention can realize a packaging bag that can be subjected to retort treatment, and substantially all of its constituent films can be polyolefin films. Such a laminate can be said to be a (mono material) packaging material made of a single material, and is expected to have improved or even excellent recyclability.

REFERENCE SIGNS LIST

11 . . . First base material layer; 12 . . . Second base material layer; 13 . . . Sealant layer; S . . . Adhesive agent layer; 100 . . . Laminate.

What is claimed is:

1. A laminate comprising a first base material layer, a second base material layer, and a sealant layer in this order,
wherein the first base material layer, the second base material layer, and the sealant layer all include a polyolefin film;
the sealant layer consists of a polyolefin and optionally, at least one of an antioxidant and a light stabilizer; wherein
the laminate further comprises (a) an adhesive layer in directed contact with a surface of the polyolefin film of one of the first base material layer and the second base material layer; (b) an inorganic oxide layer in direct contact with the adhesive layer; and (c) a gas barrier coating layer in direct contact with each of the inorganic oxide layer and a surface of the polyolefin film of the other of the first base material layer and the second base material layer;
the gas barrier coating layer is formed from a composition containing at least one selected from the group consisting of a hydroxyl group-containing polymer compound, a metal alkoxide, a silane coupling agent, and hydrolyzates thereof;
each of the first base material layer, the second base material layer, and the sealant layer has a heat shrinkage rate, in a travel direction (MD direction) after heating at 120° C. for 15 minutes, which satisfies the following inequalities:

Heat shrinkage rate of the second base material layer≤5% (Inequality 1)

Heat shrinkage rate of the second base material layer≥Heat shrinkage rate of the first base material layer (Inequality 2)

Heat shrinkage rate of the second base material layer≥Heat shrinkage rate of the sealant layer (Inequality 3), wherein
Heat shrinkage rate (%)=(Travel-direction length before heating−Travel-direction length after heating)/Travel-direction length before heating×100, wherein the sealant layer consists of the polyolefin and the antioxidant; the sealant layer consists of the polyolefin and the light stabilizer; or the sealant layer consists of the polyolefin, the antioxidant and the light stabilizer.

2. The laminate of claim 1, wherein the heat shrinkage rates satisfy the following inequalities:

Heat shrinkage rate of the second base material layer−Heat shrinkage rate of the first base material layer≥0.3% (Inequality 4)

Heat shrinkage rate of the second base material layer−Heat shrinkage rate of the sealant layer≥0.5% (Inequality 5).

3. The laminate of claim 1, wherein the heat shrinkage rate satisfies the following inequality:

Heat shrinkage rate of the sealant layer≤2% (Inequality 6).

4. The laminate of claim 1, wherein the inorganic oxide layer contains silicon oxide.

5. The laminate of claim 1, which is used in a retort pouch.

6. A packaging bag obtained by forming the laminate of claim 1 into a bag.

7. The laminate of claim 1, wherein the sealant layer consists of the polyolefin and the antioxidant.

8. The laminate of claim 1, wherein the heat shrinkage rate of the second base material layer is 3% or less.

9. The laminate of claim 1, wherein the heat shrinkage rate of the sealant is 1% or less.

10. The laminate of claim 1, wherein the sealant layer consists of the polyolefin and the light stabilizer.

11. The laminate of claim 1, wherein the sealant layer consists of the polyolefin, the antioxidant and the light stabilizer.

12. The laminate of claim 1, wherein sealant layer consists of homopropylene and optionally, at least one of an antioxidant and a light stabilizer.

13. A packaging bag obtained by forming a laminate into a bag, wherein the laminate comprises a first base material layer, a second base material layer, and a sealant layer in this order,
wherein the first base material layer, the second base material layer, and the sealant layer all include a polyolefin film;
the sealant layer consists of a polyolefin and optionally, at least one of an antioxidant and a light stabilizer; wherein
the laminate further comprises (a) an adhesive layer in directed contact with a surface of the polyolefin film of one of the first base material layer and the second base material layer; (b) an inorganic oxide layer in direct contact with the adhesive layer; and (c) a gas barrier coating layer in direct contact with each of the inorganic oxide layer and a surface of the polyolefin film of the other of the first base material layer and the second base material layer;
the gas barrier coating layer is formed from a composition containing at least one selected from the group consisting of a hydroxyl group-containing polymer compound, a metal alkoxide, a silane coupling agent, and hydrolyzates thereof;
each of the first base material layer, the second base material layer, and the sealant layer has a heat shrinkage rate, in a travel direction (MD direction) after heating at 120° C. for 15 minutes, which satisfies the following inequalities:

Heat shrinkage rate of the second base material layer≤5% (Inequality 1)

Heat shrinkage rate of the second base material layer≥Heat shrinkage rate of the first base material layer (Inequality 2)

Heat shrinkage rate of the second base material layer≥Heat shrinkage rate of the sealant layer (Inequality 3), wherein
Heat shrinkage rate (%)=(Travel-direction length before heating−Travel-direction length after heating)/Travel-direction length before heating×100.

* * * * *